United States Patent [19]
Stamenkovic

[11] 3,811,295
[45] May 21, 1974

[54] MEANS FOR FATIGUE PROOFING A SOLID ROTARY SHAFT

[76] Inventor: Hrista Stamenkovic, 4426 12th St., Riverside, Calif. 92501

[22] Filed: June 12, 1972

[21] Appl. No.: 261,784

Related U.S. Application Data

[63] Continuation-in-part of Ser. No. 25,733, April 6, 1970, abandoned.

[52] U.S. Cl. .................................. 64/1 V, 64/23.5
[51] Int. Cl. .............................................. F16d 1/00
[58] Field of Search .......... 64/1, 1 V, 23.5; 52/223, 52/224, 225

[56] References Cited
UNITED STATES PATENTS

| | | | |
|---|---|---|---|
| 1,872,160 | 8/1932 | McCiven et al | 64/1 R |
| 2,890,576 | 6/1959 | Bentley, Jr. | 64/1 R |
| 3,585,815 | 5/1971 | Hubbard | 64/1 |

Primary Examiner—Benjamin W. Wyche
Assistant Examiner—Randall Heald
Attorney, Agent, or Firm—Peter H. Firsht; John H. Crowe

[57] ABSTRACT

Fatigue is prevented in a solid rotary shaft by maintaining it devoid of inflection points and operating it in a pair of bearings to prevent buckling of the shaft because of the bending or vibrating action of applied loads which tend to induce tensile forces in the shaft leading to fatigue failure. This is accomplished by providing at least one longitudinal bore in the shaft and anchoring a closely fitted tensioned tendon in the bore in a manner placing the shaft solely in compression to a degree sufficient to neutralize substantially the tensile stresses induced in the shaft during rotation for maintaining the shaft devoid of reversals of curvature and preventing the creation of an inflection point, the close fit of the tendon in the bore confining the tendon against lateral movement relative to the bore and preventing an inflection point in the tendon. Preferably, there are several bores in the shaft arranged adjacent the periphery thereof, each bore having a closely fitted tensioned tendon anchored therein, the tendons being collectively effective for maintaining the shaft in compression and preventing the creation of an inflection point in the shaft. The tension of the tendons can be varied for controlling the oscillation of the shaft.

10 Claims, 16 Drawing Figures

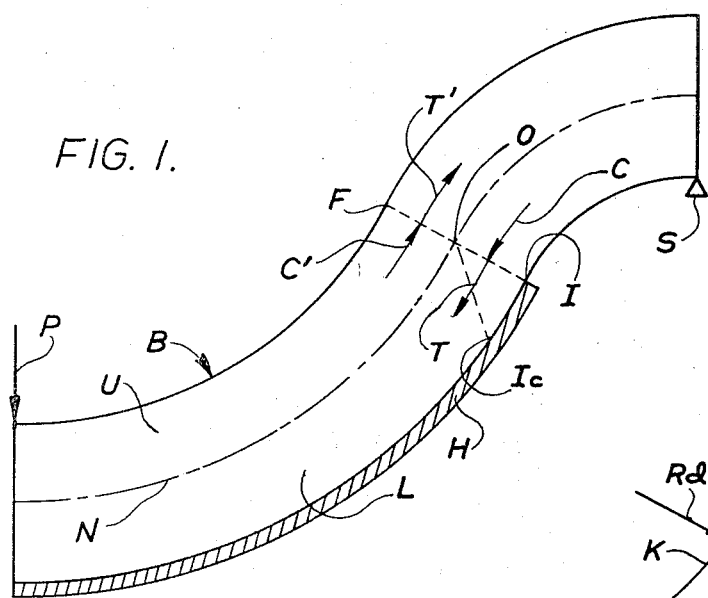
FIG. 1.
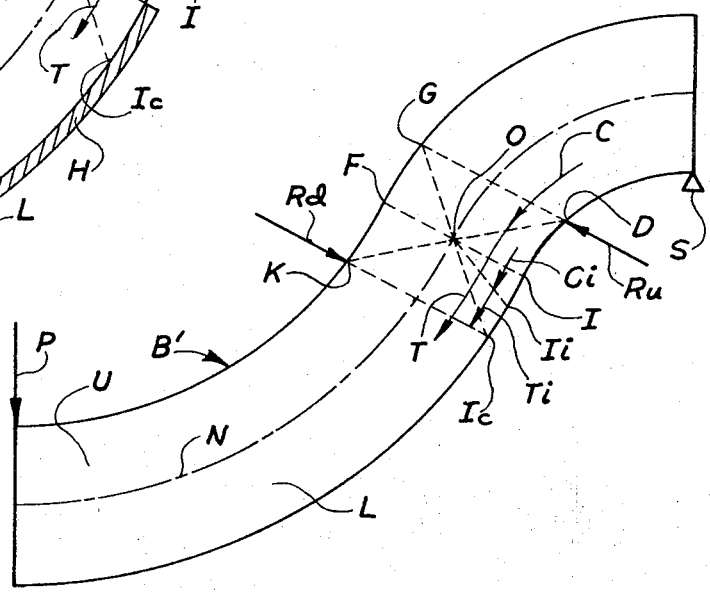
FIG. 2.
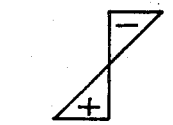
FIG. 8a
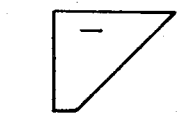
FIG. 8b
FIG. 8c
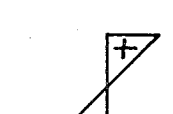
FIG. 8d
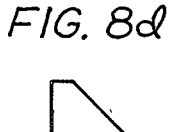
FIG. 8e
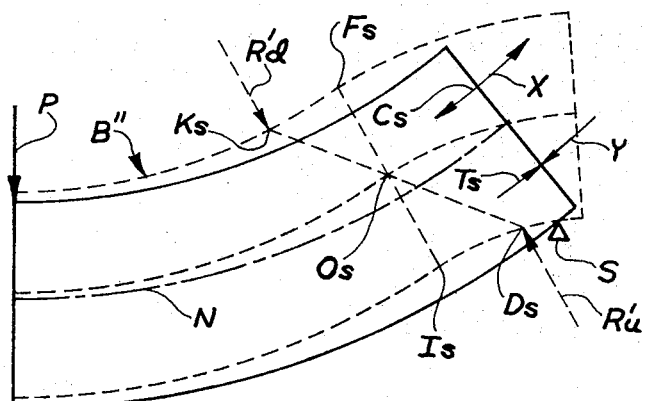
FIG. 4.
INVENTOR
HRISTA STAMENKOVIC

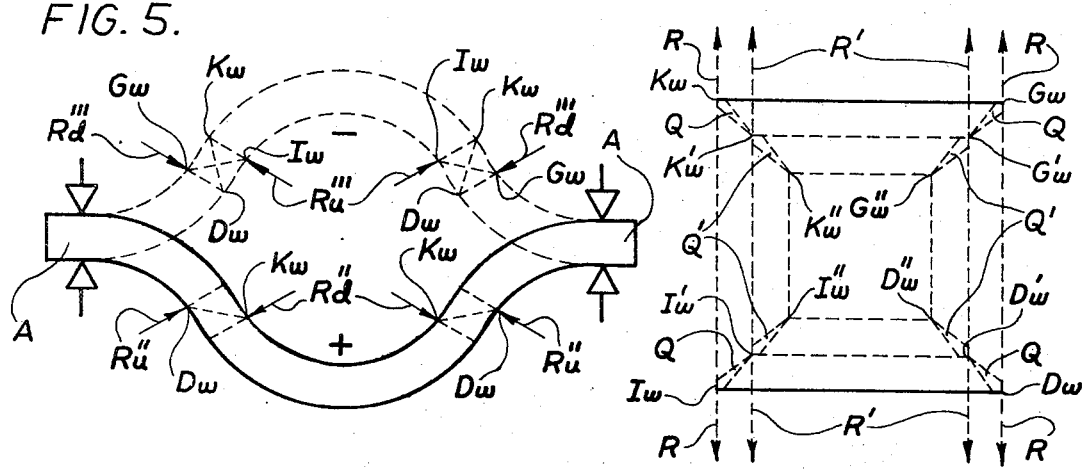
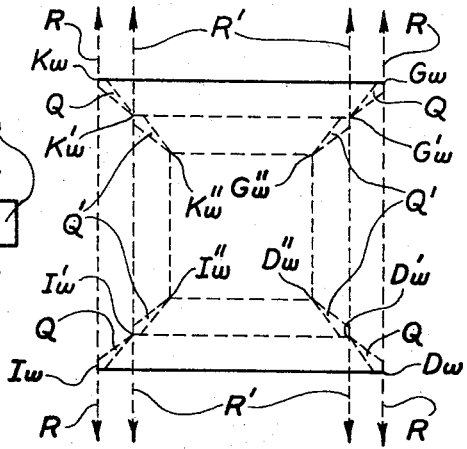
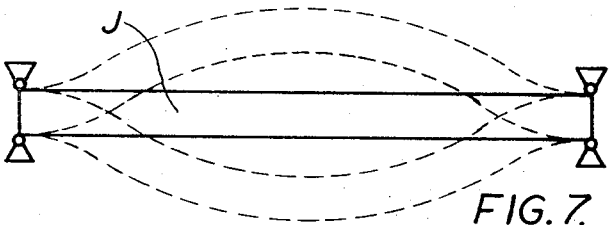
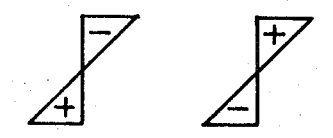
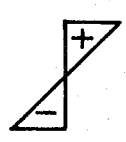
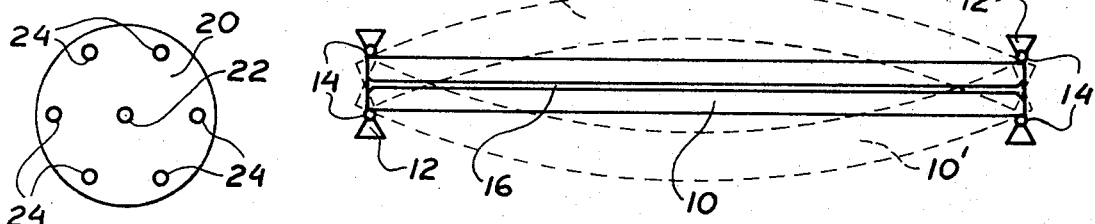
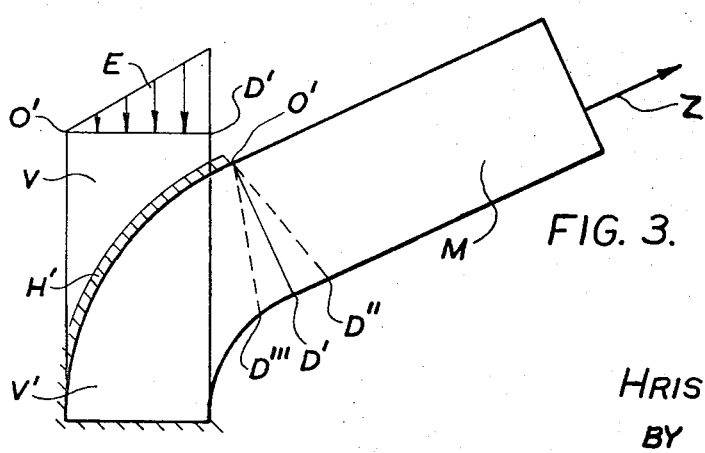
INVENTOR
HRISTA STAMENKOVIC 3,811,295

MEANS FOR FATIGUE PROOFING A SOLID ROTARY SHAFT

CROSS REFERENCE TO OTHER APPLICATION:

This application is a continuation-in-part of copending Application Ser. No. 25,733, filed Apr. 6, 1970 now abandoned, for METHOD AND MEANS FOR FATIGUEPROOFING MEMBERS TO PREVENT DIAGONAL SHEAR AND FATIGUE FAILURE THEREIN, by Hrista Stamenkovic.

BACKGROUND OF INVENTION:

The present invention relates to rotary shafts, and more particularly to a method and means for preventing fatigue failure in such shafts because of the bending or vibrating action of applied loads during operation.

Various arrangements have been proposed for eliminating or reducing fatigue in operating members.

SUMMARY OF INVENTION:

The present invention is concerned with the provision of a method and means for fatigueproofing a shaft to prevent in the shaft the occurrence of structural failure classically denominated "fatigue" by which applicant prefers to call separation or cleavage forces causing a division or spreading apart as though cleft by a wedge.

Applicant has, after extensive study, research and experimentation, determined that an inflection point is the nucleus for cleavage forces and is therefore the crux of the problem of fatigue failure. When inflection points are eliminated, a member can vibrate indefinitely without danger of cracking due to fatigue.

It is therefore a primary objective of the present invention to provide a method and means for maintaining a shaft devoid of reversals of curvature and preventing the creation of an inflection point in the shaft. This is accomplished by providing at least one longitudinal bore in the shaft in which a closely fitted tensioned tendon is anchored in a manner placing the shaft solely in compression to a degree sufficient to neutralize substantially tensile forces induced in the shaft during rotation because of the bending or vibrating action of applied loads. The tendons can be in the form of wires, cables, rods and the like. The close fit of the tendon in the bore confines the tendon against lateral movement relative to the bore and prevents the creation of an inflection point in the tendon, thus avoiding fatigue failure of the tendon. Preferably, several bores are provided in the shaft arranged adjacent the periphery thereof, each bore having a closely fitted tendon therein, the tendons being collectively effective for maintaining the shaft in compression and preventing the creation of an inflection point in the shaft. The tension of the tendons can be varied for controlling the vibrational amplitude and oscillation of the shaft.

The importance and value of having a rotary shaft in which fatigue failure is obviated are to be measured not only by the saving in eliminating down time for repairs but also the avoidance of the loss of life, limb and property that usually attends such failure. For example, witness the loss of life and property in helicopter disasters because of fatigue failure.

BRIEF DESCRIPTION OF DRAWINGS:

FIG. 1 is a schematic diagram illustrating the action of internal forces in a portion of a continuous beam made of separate upper and lower sections, the beam being deformed by an external load and its deformation exaggerated for better illustration.

FIG. 2 is a schematic diagram like FIG. 1 but illustrating a portion of a continuous monolithic beam and the action of cleavage forces therein.

FIG. 3 is a schematic diagram illustrating the action of cleavage forces in an experiment conducted on a column of elastic material.

FIG. 4 is a schematic diagram illustrating a half portion of a simple beam before and after buckling.

FIG. 5 is a schematic diagram of a clamped piece of wire subjected to repeated bending and illustrating the rectangular prismatic portions thereof in which cleavage forces act.

FIG. 6 is a larger scale schematic diagram of one of the rectangular prisms of FIG. 5 and illustrating the action of cleavage forces along the diagonals thereof.

FIG. 7 is a schematic diagram illustrating the vibration of a classical structural or operating member.

FIGS. 7a and 7b are diagrams graphically illustrating the stresses in the member of FIG. 7 in different positions thereof.

FIG. 8 is a schematic illustration of the vibration of a rotary member embodying the principles of the present invention.

FIGS. 8a–8e are stress diagrams related to the member of FIG. 8.

FIG. 9 is a diagrammatic end view of a rotor shaft showing the location of tendons for prestressing the shaft.

DESCRIPTION OF INVENTION:

To understand the phenomena of diagonal and fatigue failure in materials, it is necessary to understand the action of internal forces and the arrangement of stresses in the vicinity of an inflection point in a deformed beam. Referring to FIG. 1, there is shown a portion of a composite continuous beam B, of elastic material, resting on a support S and made up of two separate sections U and L, above and below a neutral axis N. Assume that the natural friction between the sections is extremely low and that the sections are ideally fastened only at their ends, and thus represent a single beam. Also assume that the beam is subjected to a load P and is deformed to the exaggerated shape shown. Coincident with the first instance of deformation, inflection points exist along a cross section IOF which passes through reversals of curvature and is a dividing plane of zero stresses between the compression and tension zones in the beam sections L and U. Immediately thereafter, compressive and tensile restoring forces are induced in the beam which strive to return the beam portion to the position it occupied before deformation. That is, the part of the beam portion to the right of the cross section IOF strives to return to its initial position in which the fibers, from uppermost to lowermost, are substantially equal in length to the neutral axis N. The part of the beam portion to the left of cross section IOF also strives to become straight with all the fibers thereof substantially equal. There are no stresses at the neutral axis.

The resultant of the compressive restoring forces in the compression zone of the lower beam section L is represented by arrow C and the resultant of tensile restoring forces in the tension zone of the lower beam section is represented by the arrow T. The force resultants act in the directions shown and strive to restore the cross section IOF to its initial position. The upper beam section U has similar restoring force resultants C' and T' acting in the other direction, as shown in the Figure.

The bottom side of the deformed beam B to the left of the inflection point I is bounded by a rigid holder H configured to follow the contour of such bottom side and operative to support the beam. If now the lower beam section L is cut along line IO, the cross section of the lower beam section will move, under the combined action of the restoring forces C and T, to a location IcO, which is substantially identical with the initial position of the cross section prior to deformation of the beam. By this movement, the stresses in the lower beam section are relieved and the lowermost fiber of the right (compressed) part becomes substantially equal to the neutral axis for this part. The lowermost edge and neutral axis of the left (tensioned) part also become substantially equal. In other words, the right and left parts of the lower beam section strive to return to their initial position prior to deformation but because there are no stresses at the neutral axis, the fibers along the neutral axis will remain unaffected but the remaining fibers, which are stressed, will tend to release the stresses therein.

Consider now that the beam is monolithic to provide beam portion B' shown in FIG. 2, corresponding features being referenced by similar reference characters, and no holder against the bottom side. As explained later, because of the deformation of the beam portion and the action of internal forces there is a rearrangement of the stresses in the beam sections and the dividing plane between compression and tension becomes disposed along the diagonal cross section DOK.

The elastic curve of the beam follows the neutral axis N, and is fixed, and inflection point O is immobile. If now the beam is cut along the cross section IO, movement thereof is limited by the immobility of point O and the adhesion along the neutral axis and the cohesion of the material so that the cross section cannot move to location IcO as before. Instead, the cross section will rotate about point O and some movement will occur within the triangular prism defined by triangle IcOD. Such movement occurs because of the tensile restoring forces $T_i$ in triangular prism IOIc and compressive restoring forces $C_i$ in triangular prism IOD. The action of such forces is to move the cross section IO to a new location I$i$O and with such movement there is a simultaneous release of stresses in the triangular prisms IOD and IOIc.

However, even if the beam is uncut, there is a rearrangement of internal forces in the vicinity of the inflection point O. Since the stresses are zero in the cross section IO at the first instant of deformation, the uncut beam will behave like the cut beam and there will be a simultaneous release of stresses in triangular prisms IOD and IOIc, with the result that common point I of both triangular prisms moves to the new location I$i$. This takes place immediately after the beam has been deformed under the action of the external load P. Because of the new stress condition, there is a slight change in the deflection of the beam, and tensile restoring forces T will begin to penetrate cross section IcO into a stressless mass of triangular prism IcOD as a reaction against further bending. This penetration results from the cohesion of the material of the beam at cross sections IcO, I$i$O, IO and DO. Thus, the tensile force extends its action to the limits of the cross section DO and this cross section now becomes the dividing plane between compression and tension in the lower section of the beam.

Similarly, the internal forces (not shown) in the upper section of the beam will create a dividing plane along KO which is coplanar with dividing plane DO. It is to be noted that the dividing plane DOK is not perpendicular to the neutral axis but is diagonally disposed relative thereto. It is along this dividing plane that the cleavage forces act, to cleave or separate the beam. Also, if diagonal failure occurs, it will occur along this same plane.

The action of cleavage forces has been demonstrated and physically observed in an experiment. FIG. 3 schematically illustrates a rectangular, vertical column V, of elastic rubber, having a fixed base and topped by a horizontal planar cross section O'D'. The column was eccentrically loaded by compressive forces E so as to deform the column to a new shape V', without tensile stresses, which shape was retained in place by a holder H' along the convex side. The deformed column was coated with a thin layer or coating of gypsum which is very sensitive to tension. When the forces E were removed, the holder H' prevented return of the column to its original position but the cross section O'D' had rotated counterclockwise about point O' to a new location O'D''. Also observed were cracks in the gypsum layer, along radial lines through point O', ranging in width from a maximum adjacent the cross section O'D'' to zero or invisible at point D'''. This action is quite similar to that previously described in connection with the rearrangement of internal forces and release of internal stresses in the monolithic beam, and means that the prismatic portion of the column defined by triangle O'D'D''' had freed itself completely of internal stresses.

To the free end O'D'' of the deformed column there was joined another piece of rubber M (with the same characteristics and cross section as the first piece V), to which a variable tensile force Z was eccentrically applied. The force Z was gradually increased until a magnitude was reached at which it was observed that the gypsum layer on the triangle D''O'D''' fell completely away but there was no cracking whatsoever in the gypsum layer to the left of line D'''O' nor in the rubber to the right of the line O'D'''. With further gradual increase of the tensile force Z to about twice the first magnitude, it was observed that a small V-shaped crack developed in the rubber at point D''' which was directed toward point O'. Further increase in the tensile force resulted in widening of the crack which eventually reached point O' and the column failed along line D'''O'. There were no cracks noted elsewhere, not even in the joint between the two pieces of rubber.

This experiment clearly indicates that the failure of the column did not occur as a result of shearing; that is, sliding forces, along line D'''O', nor as a result of diagonal tensile forces, but because of some force or forces that caused a division or spreading apart along the line, as though cleft by a wedge, and for this reason are termed cleavage forces.

Returning to FIG. 2, the internal forces in the beam include vertical and horizontal shearing forces, as well as compressive and tensile forces. Composing these forces in the cross section IOF yields resultants Ru and Rd, the former acting through points D and G, and the latter through points K and Ic, in the directions shown. The resultant Ru tends to return the right portion of the beam upward to its original or initial position, while the resultant Rd tends to cause the left portion to straighten out downwardly. These resultants therefore tend to cause the beam to spread apart or cleave along the dividing or cleavage plane DOK. This cleavage of the beam is the only way that it can release internal stresses and it is identical to the cleavage earlier described in connection with the experiment involving FIG. 3.

Simultaneously with the release of internal stresses and their rearrangement in the vicinity of an inflection point, there is also a rearrangement of cleavage forces acting along the diagonal plane passing through the inflection point between the compression and tension zones in the bent beam. For example, the resultants Ru and Rd act as a couple to reinforce and accelerate cleavage and separation of the beam along diagonal plane DOK. Where the strength of the material of the beam is greater than the cleavage stresses, there is no failure. However, if the cleavage stresses in the beam exceed the strength of the material, failure occurs.

Referring to FIG. 4, there is schematically illustrated a half portion of a simply supported beam B″, before and after buckling, the shapes being exaggerated for better illustration. Such a beam in its natural unloaded state has no reversals of curvature, and hence no inflection points. However, under the action of load P the beam bends to a deformed shape (full lines) and compressive and tensile forces, the resultants of which are represented by the arrows Cs and Ts build up within the beam. Simultaneously, as a reaction to such forces, there are created restoring forces and horizontal shearing forces, the former striving to return the beam to its unloaded position, the latter tending to shear the beam along the neutral axis.

With movement of the load P nearer the support S, the horizontal shearing forces increase in the right portion and decrease in the left portion. However, since the cohesive forces which bond the atoms of the material together are greater than any possible horizontal shearing forces, horizontal shear cannot occur along the neutral axis. Since horizontal shear cannot occur, there is an accumulation of potential elastic energy in the beam, including the horizontal shearing forces and the restoring forces. The resultants of these forces are represented by the arrows X and Y and act as a couple tending to return the beam to its original shape and location and free it of stresses.

When the forces X and Y increase to a magnitude greater than the forces Cs and Ts, the beam will buckle and assume a new shape (dotted lines), creating inflection points along a cross section IsOsFs. This cross section is identical with the cross section IOF in the beam of FIG. 2 and cleavage forces will develop along a dividing plane DsOsKs because of the forces R′u and R′d which are the resultants of the composition of forces on the cross section and act through points Ds and Ks in the same manner that resultants Ru and Rd act through points D and K of the dividing or cleavage plane DOK in FIG. 2. Thus, a simply supported beam which has buckled becomes identical to a continuous beam and will behave and fail in the same characteristic manner.

The foregoing is especially true for a relatively short deep beam compared to a long shallow beam, both having the same cross section. The long beam has a considerably greater horizontal area at the neutral axis and is more limited in the load it can take before failure due to exhaustion of compressive and tensile stresses. The short beam can take a considerably greater load but its neutral axis horizontal area is much smaller, with the result that the horizontal shearing forces can build up to a magnitude per unit area much larger than in the long shallow beam. In other words, a short deep simple beam can buckle but a long shallow simple beam cannot because of the differences in the horizontal shearing forces at the neutral axis of each, and because the long shallow beam will very likely fail due to exhaustion of compressive and tensile stresses before the horizontal shearing forces can build up sufficiently to cause buckling.

It is therefore clear that failure along a diagonal in a beam, whether simply supported or continuous, results not from shear forces of equal intensity and opposite direction, acting in one plane, nor from diagonal tensile forces, but from cleavage forces which tend to cleave or spread the beam apart along a diagonal plane passing through an inflection point on the neutral axis of the beam.

Many hypotheses have been postulated in efforts to explain the mechanism of fatigue. For example, in the field of metals, statements have been made referring to "weaker surface layer against fatigue forces;" "the new crystallization of metal under the influence of fatigue;" etc. Nevertheless, there has been no satisfactory explanation of the exact nature of the mechanism of fatigue.

Applicant has discovered that cleavage forces are also involved in the fatigue failure of members. However, in the case of fatigue the cleavage forces act in alternation along intersecting diagonal planes of a prismatic portion of the member until it cracks and weakens progressively, and eventually fails.

This can be exemplified by a piece of wire W which, as schematically shown in FIG. 5, has clamped ends A and can be loaded simply by bending it with the fingers to be made concave by downward pressure and convex by upward pressure. This bending is substantially similar to the action which would occur by applying vibrating forces of equal magnitude. The elastic curve of the wire is identical with the elastic curve of a continuous beam, such as the beam of FIG. 2. The wire can be considered as a beam which, when bent downwardly (full lines), produces force resultants R″u and R″d acting as shown to cause cleavage along the diagonals DwKw adjacent the ends A. The resultants R″u, R″d are similar in composition and action to the resultants Ru, Rd in FIG. 2 from which it is clear that the cleavage diagonals DwKw and DK are similar. When the wire is bent upwardly (dotted lines) there are force resultants R‴u and R‴d and the cleavage is now along new diagonals IwGw, which are synonymous with the diagonals IcG in FIG. 2. The diagonals DwKw and IwGw intersect in a line passing through the inflection point on the neutral axis and terminate at the corners of rectangular prismatic portions DwIwKwGw. The resultants, when operative, act along cross sections DwGw and IwKw of the prisms and can be equated to force couples R acting at the corners of the prisms, as shown in FIG. 6.

After repeated bendings of the wire, cleavage and cracks Q will develop, first at one set of diagonally opposite corners, and then at the other set, penetrating to points D'w, I'w, K'w and G'w and reducing the effective cross-sectional area of the wire. For example, assume that cleavage cracks Q first develop at the corners Dw and Kw. This cleavage causes a regrouping of the internal forces within the material, so that a force couple R' will occur at points D'w and K'w, which has a shorter arm than the original force R at points Dw and Kw, and there is a proportionate increase in the cleavage forces. Reversing the bending will cause cleavage cracks Q to develop at the corners Gw and Iw and a force couple R' will occur at points G'w and I'w having greater cleavage forces than the force couple R originally at the corners. The force couples R' will cause cracks Q'. This process of alternate cracking continues progressively until the effective cross-sectional area of the wire is reduced to the area D"w, I"w, K"w, G"w, an area insufficient to withstand the compressive and tensile forces imposed thereon by the outside loading. Finally, a sudden exhaustion of compressive and tensile stresses occurs in the reduced area, accompanied by sudden rupture and failure. For these reasons, the cross section of a fatigue failure has an inner area that is relatively smooth and bright, created by the rupture, and an outer or peripheral border surface that is relatively dark and matted, created by cleavage forces.

From the foregoing, it is obvious that repeated stressing does not produce any change in the crystalline structure of the metal of the wire, nor is the metal necessarily weaker at the surface. Also, if the applied forces are varied, the cleavage forces will vary and the number of stress cycles required to create failure will vary. And when the stresses remain below critical values, the material can withstand an indefinitely large number of stress cycles, because cleavage of material can occur only when there is a cleavage force greater than the strength of the material against cleavage. The effect of a given number of stress cycles is the same, whether they are applied continuously or intermittently, because under repeated stresses the cleavage of homogeneous material breaks the atomic bonds thereof, resulting in submicroscopic cracks. For a given number of atoms in a given cross section of a beam, there is a given amount of mechanical energy required to destroy the bonds of the atoms. In other words, as the working stress on a piece of material is repeated, the cracks spread from the surface inwardly along the diagonals of the cleavage prism. After a time, there is so little structurally sound material left that the normal stress on the piece is greater than the strength of the remaining material and the piece ruptures suddenly and fails.

Thus, as a result of the aforementioned discovery of the true relation between applied loads and the creating of inflection points and cleavage forces, the inflection point is the crux of the problem of diagonal and fatigue failure, and the solution to the problem lies in maintaining the structural or operating member devoid of inflection points. Even minimizing the reversals of curvature minimizes the cleavage forces acting through the inflection points. This applies to all types of material, whether metal, concrete, wood, plastics, glass, ceramics, or the like.

For an inflection point to originate in a beam with two supports, there must be a restoring force couple at the end of the beam which occurs when the beam is loaded simultaneously by compression and tension. Thus, if only one of the forces is acting, for example, that of compression, there can be no restoring force couple and buckling cannot occur because there is no moment at the end of the beam. When there is no buckling, there are no inflection points, and no nucleus for cleavage forces, and diagonal or fatigue failure therefore cannot take place. When a member is freely supported on two supports and only compression exists in the member, it will vibrate as a whole body, without inflection points.

Applicant's discovery is particularly applicable to rotary shafts which usually have to operate in environmental conditions in which they are subjected to the action of applied external forces. This could be as a rotary axle in an automobile or the rotor shaft of a helicopter, and the like.

First consider a conventional rotary shaft J, schematically illustrated in FIG. 7. In its static condition, that is, with no external forces applied thereto, the shaft is substantially straight, as shown in full lines, with no inflection points therein. However, when external forces of sufficient magnitude are applied to the shaft, it will bend and vibrate, as shown in dotted lines, to become simultaneously loaded with tensile and compressive stresses similar to the wire of FIG. 5 and beam of FIG. 2. FIG. 7a graphically illustrates the stress diagram for the shaft when it is disposed to one side of its straight position (or below the same as seen in FIG. 7), in which case maximum tensile stress resides in the lowermost fibers and maximum compressive stress resides in the upper fibers. During vibration, under the action of the applied external forces, the shaft will move through the straight position and be disposed on the other side thereof, in which case the stress diagram is reversed, as shown in FIG. 7b. Under such conditions, there is a reversal of curvature with the result that inflection points and cleavage forces are created in the shaft. Should these cleavage forces attain a magnitude greater than the strength of the material of the shaft, there will eventually be a failure along one or both diagonals.

FIG. 8 schematically illustrates a rotary shaft 10, freely supported on two mounts 12 with suitable rollers or journals 14. In accordance with the present invention, the shaft 10 is prestressed by means of a tendon 16 disposed axially thereof, and anchored thereto in tensioned condition so as to place the shaft under compression to a predetermined degree, as graphically represented by the stress diagram in FIG. 8a. Thus, when external forces are applied to the prestressed shaft 10 and it is bent or vibrated from its straight position to the dotted line position 10', there will be no buckling because the tensile stresses induced by the bending or vibrating, represented by the stress diagram in FIG. 8b, are absorbed or neutralized by the compressive stresses resulting from prestressing, so that even under the action of the applied external forces the shaft still remains in compression, as shown in the stress diagram of FIG. 8c. When the shaft 10 bends or vibrates to the dotted line position 10", the stress induced by the application of the external forces is reversed as shown in the diagram of FIG. 8d, which combines with the compressive stress caused by the prestressing, FIG. 8a, so that the resultant stress diagram is as shown in FIG. 8e, still in compression. The shaft 10 is thus subjected only to one stress, compression, and there is no restoring force couple or moment at the end thereof which can cause buckling. Prestressing of the shaft also varies its vibrational amplitude and frequency and can be employed to have it oscillate as desired.

Of course, the shaft will be designed to accommodate the compressive stresses resulting from prestressing, as well as design stresses, in order that the combined compressive stresses do not exceed the compressive strength of the material or the strength standard set for such material. The level of prestressing therefore depends upon the magnitude of the vibrating or bending forces and must be high enough to substantially eliminate any tensile stresses induced in the shaft under the action of such forces.

The location of prestressing in the shaft depends upon the direction of the vibration forces, the center of gravity of the cross section or the neutral axis being the common place for prestressing. However, if the cross section allows it, peripheral prestressing is preferred. For example, as shown in FIG. 9, a shaft 20, such as a helicopter rotor shaft or the like, can be prestressed by the use of a tendon through a central axial bore 22, or by the use of a plurality of tendons in bores 24 located near the periphery of the shaft, or both. The bores 24 are preferably arranged equiangularly about the central axis of the member 20 at equal distances therefrom. The tendons can be rods, wires, cables or other nonhollow forms. Each tendon fits closely in its bore so that it is confined against lateral movement relative to the bore for preventing the creation of an inflection point in the tendon which could lead to its failure and failure of the shaft. The tendons are adjustable so that the tension thereof can be varied to true the shaft and for controlling its vibrational amplitude to have the shaft oscillate as desired.

The effect of the present invention is to prevent the creation of inflection points and cleavage forces which lead to diagonal and fatigue failure while permitting vibration of a rotary shaft in its operational environment. This prolongs the useful life of the shaft so that it can operate indefinitely without breakdown from diagonal or fatigue failure with an attendant saving of life, limb and property, and the avoidance of down time for repairs other than the usual wear and tear.

I claim:

1. A method for fatigueproofing a solid rotary shaft operable in environmental conditions in which the action of applied loads during rotation of the shaft tends to bend and vibrate the shaft and induce tensile stresses therein, comprising the steps of:
   a. providing at least one bore in said shaft extending longitudinally thereof coextensively; and
   b. anchoring a closely fitted tensioned tendon in said bore in a manner placing the shaft solely in compression to a degree sufficient to neutralize substantially the tensile stresses induced in said shaft during rotation thereof for maintaining the shaft devoid of reversals of curvature and preventing the creation of an inflection point in the shaft, the close fit of the tendon in the bore confining the tendon against lateral movement relative to the bore for preventing the creation of an inflection point in the tendon which could lead to its failure and failure of the shaft.

2. The method of claim 1 wherein said shaft is journaled for rotation in a sole pair of encircling journal mounts.

3. The method of claim 2 wherein said shaft is disposed substantially horizontally and is solely supported by said pair of journal mounts as a simple beam for preventing the formation of a restoring force couple which tends to cause a reversal of curvature in the shaft.

4. The method of claim 1 wherein several bores are provided longitudinally of the shaft coextensively therewith, and each bore has anchored therein a closely fitted tensioned tendon, said tendons being collectively effective for maintaining the shaft in compression and preventing the creation of an inflection point in the shaft, the close fit of each tendon in its bore confining the tendon against lateral movement relative to its bore for preventing the creation of an inflection point in the tendons.

5. The method of claim 4 wherein the tension of the tendons can be varied for controlling the vibrational amplitude and oscillation of the shaft.

6. The method of claim 4 wherein the bores are arranged adjacent the periphery of the shaft.

7. Means for fatigueproofing a solid rotary shaft rotatable in environmental conditions in which the action of applied loads tends to bend and vibrate the shaft and induce tensile stresses therein, comprising:
   at least one closely fitted tensioned tendon anchored in a longitudinal bore in the shaft extending the length thereof and effective for placing the shaft solely in compression sufficient to neutralize substantially the tensile stresses induced in the shaft during rotation thereof, the close fit of the tendon in the bore confining the tendon against lateral movement relative to the bore for preventing the creation of an inflection point in the tendon which could lead to its failure and failure of the shaft.

8. The means of claim 7 wherein said shaft is journaled for rotation in a sole pair of encircling journal mounts.

9. The means of claim 7 wherein said shaft has several full length longitudinal bores therein, each bore having anchored therein a closely fitted tensioned tendon, said tendons being collectively effective for maintaining the shaft in compression and preventing the creation of an inflection point in the shaft, the close fit of each tendon in its bore confining the tendon against lateral movement relative to its bore for preventing the creation of an inflection point in the tendons.

10. The means of claim 9 wherein the tendons are adjustable so that the tension thereof is varied for desired oscillation of the shaft.

* * * * *